United States Patent
Khafagy et al.

(10) Patent No.: US 10,086,704 B2
(45) Date of Patent: Oct. 2, 2018

(54) SYSTEM AND METHOD FOR MODULATING POWER TO VEHICLE ACCESSORIES DURING AUTO-START AND AUTO-STOP

(71) Applicant: Ford Global Technologies, LLC, Dearborn, MI (US)

(72) Inventors: Hafiz Shafeek Khafagy, Dearborn, MI (US); Farouq Mozip, Dearborn, MI (US); Jonathan Wentworth, Chelmsworth (GB); Eric Gerd Schaefer, Farmington Hills, MI (US); James C. Rollinson, Superior Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/062,731

(22) Filed: Mar. 7, 2016

(65) Prior Publication Data
US 2017/0253125 A1    Sep. 7, 2017

Related U.S. Application Data

(63) Continuation-in-part of application No. 15/061,151, filed on Mar. 4, 2016, now abandoned.

(51) Int. Cl.
| | | |
|---|---|---|
| *G06F 7/00* | (2006.01) | |
| *B60L 1/02* | (2006.01) | |
| *B60H 1/00* | (2006.01) | |
| *F02N 11/00* | (2006.01) | |

(52) U.S. Cl.
CPC ............ *B60L 1/02* (2013.01); *B60H 1/00271* (2013.01); *F02N 11/00* (2013.01)

(58) Field of Classification Search
USPC ............................................ 701/36
See application file for complete search history.

(56) References Cited

U.S. PATENT DOCUMENTS

| | | | |
|---|---|---|---|
| 2008/0263807 A1 | 10/2008 | Yan et al. | |
| 2009/0198439 A1* | 8/2009 | Ochiai | B60K 6/365 701/112 |
| 2010/0066302 A1* | 3/2010 | Gregg | B60W 10/26 320/104 |
| 2010/0100306 A1* | 4/2010 | Gamache | F02N 11/0803 701/113 |
| 2010/0138139 A1 | 6/2010 | Gibert et al. | |

(Continued)

FOREIGN PATENT DOCUMENTS

| | | |
|---|---|---|
| DE | 10211461 C1 | 7/2003 |
| EP | 2138712 A1 | 12/2009 |
| EP | 2172643 A1 | 4/2010 |

*Primary Examiner* — Tyler D Paige
(74) *Attorney, Agent, or Firm* — Frank A. MacKenzie; Bejin Bieneman PLC

(57) ABSTRACT

A method of controlling power to a vehicle accessory gradually shuts down power to the vehicle accessory and gradually restores power to the vehicle accessory. After a request for an auto-shutdown of an internal combustion engine of a vehicle is detected, power to the vehicle accessory is reduced on a predetermined schedule responsive to such detection. The occurrence of a restart of the internal combustion engine of a vehicle is determined, and power supplied to the vehicle accessory is increased on a predetermined schedule responsive to the restart.

17 Claims, 5 Drawing Sheets

(56) References Cited

U.S. PATENT DOCUMENTS

| | | | |
|---|---|---|---|
| 2011/0065543 A1* | 3/2011 | Usoro | B60K 6/365 |
| | | | 475/5 |
| 2011/0144837 A1* | 6/2011 | Heisel | B60K 6/48 |
| | | | 701/22 |
| 2011/0165982 A1* | 7/2011 | Hoffman | F16H 37/0853 |
| | | | 475/5 |
| 2012/0116657 A1* | 5/2012 | Kawamoto | F02N 11/0803 |
| | | | 701/113 |
| 2012/0256594 A1* | 10/2012 | Bisbing | B60W 10/08 |
| | | | 320/134 |
| 2013/0035193 A1* | 2/2013 | Janson | F02B 67/04 |
| | | | 475/211 |
| 2014/0032086 A1 | 1/2014 | Wijaya et al. | |
| 2014/0067183 A1* | 3/2014 | Sisk | B60L 11/1861 |
| | | | 701/22 |
| 2014/0200763 A1* | 7/2014 | Sisk | B60W 10/24 |
| | | | 701/36 |
| 2014/0288749 A1* | 9/2014 | Dumrongkietiman | |
| | | | B60L 11/005 |
| | | | 701/22 |
| 2015/0006026 A1* | 1/2015 | Schaffer | B60R 16/03 |
| | | | 701/36 |
| 2016/0059726 A1* | 3/2016 | Berman | H01M 10/42 |
| | | | 701/22 |

* cited by examiner

SYSTEM AND METHOD FOR MODULATING POWER TO VEHICLE ACCESSORIES DURING AUTO-START AND AUTO-STOP

BACKGROUND

Start-stop systems in vehicles equipped with internal combustion engines or internal combustion motors improve fuel economy in such vehicles by automatically stopping, or auto-stopping the engine when the vehicle comes to a stop, and automatically restarting or auto-starting the engine when sensed conditions are consistent with a desire by a vehicle operator to start moving again. The engine will not be auto-stopped when a demand for current is greater than a certain magnitude. To facilitate auto-stopping for the purpose of improving fuel economy, and to conserve battery power while in an engine-off mode of operation, certain high-demand electrical accessories may be selectively disabled during the engine-off mode. If during the process of auto-stopping, a substantial electrical load, like that associated with a heated windshield (HWS) is abruptly turned off, there will be sudden increase in a magnitude of the current and an associated voltage available to a vehicle power bus. The sudden increase in current and voltage would result in a sudden drop in demand on power from the vehicle's engine-driven alternator, causing a sudden increase of the engine speed, characterized as engine speed flare, that will impact operator drivability and satisfaction. On automatic restarting, when a substantial electrical load, like that associated with a heated windshield, is abruptly turned on, there will be sudden decrease of the voltage available to the vehicle power bus. The sudden decrease in current and voltage is associated with an increase in demand on power from the alternator, causing a sudden decrease or lugging or stumbling in the speed of the engine that will impact vehicle operator drivability and satisfaction.

DETAILED DESCRIPTION

Introduction

Disclosed herein are systems and methods for gradually turning off a vehicle accessory and gradually turning on the vehicle accessory. For example, a system as presently disclosed temporarily deactivates an exemplary heated windshield without a spike in voltage or a noticeable surge in engine speed, and activates the heated windshield without a sudden drop-off in voltage or appreciable engine speed lugging or stumbling. Alternative accessories include heated seats, electrical resistive cabin heaters and rear window defoggers.

Relative orientations and directions (by way of example, upper, lower, bottom, rearward, front, rear, back, outboard, inboard, inward, outward, lateral, let, right) are set forth in this description not as limitations, but for the convenience of the reader in picturing at least one embodiment of the structures described. Such exemplary orientations are from the perspective of an occupant seated in a driver seat, facing a dashboard.

Exemplary System Elements

Figure 1:
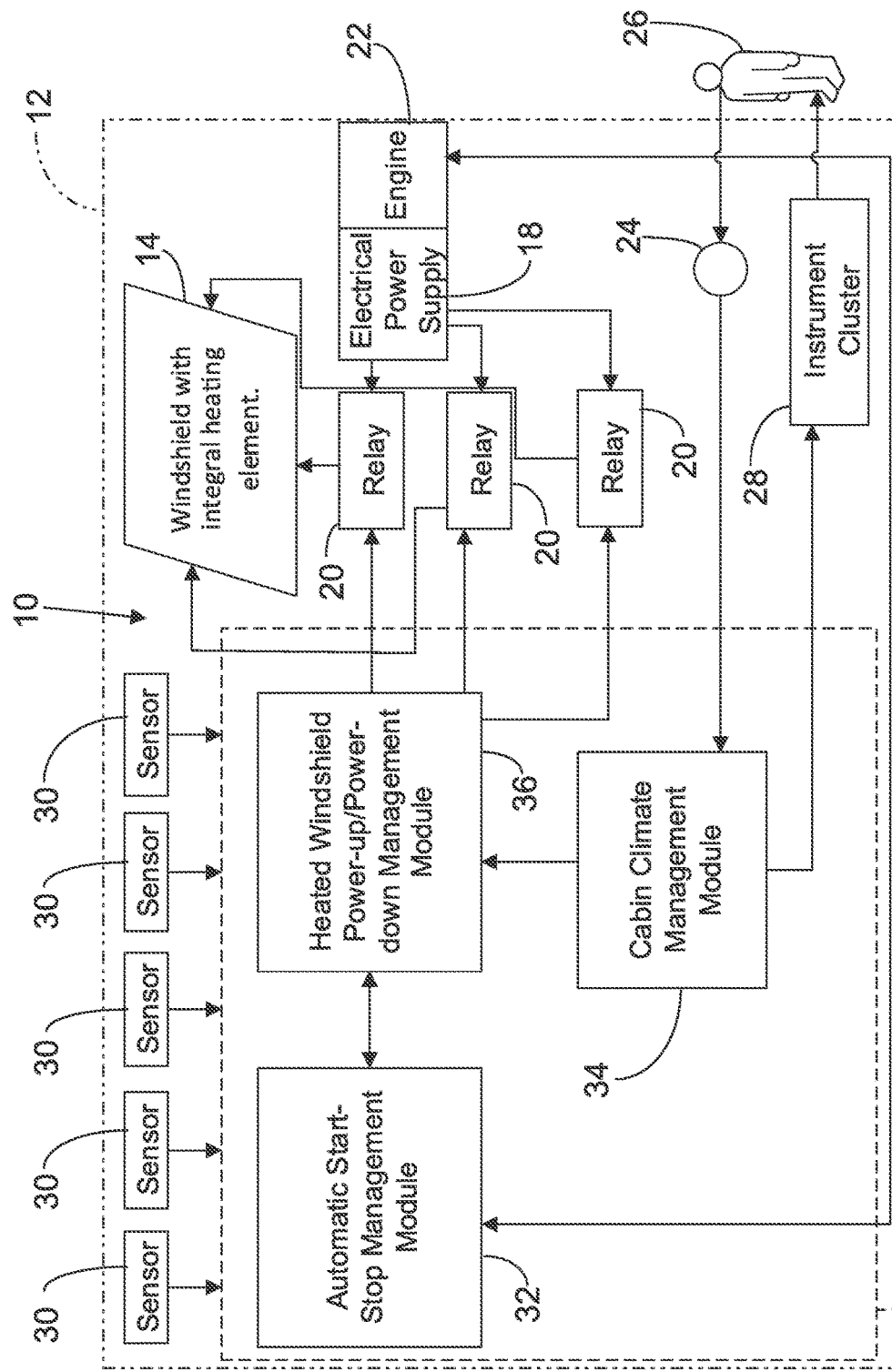
FIG. 1 is a schematic view of a vehicle incorporating an exemplary power management system for a heated windshield.

FIG. 1 is a schematic diagram of a windshield power management system 10 in a vehicle 12. Windshield power management system 10 is electrically connected with a windshield 14 having an integral heating element. Windshield 14 is alternatively characterized as a heated windshield or an HWS. An exemplary windshield power management system 10 includes an on-board computer 16, alternatively characterized as a controller or an electronic control unit ("ECU") such as is known. Computer 16 is used to selectively control an electrical power supply 18 that provides electrical power to windshield 14. Presently disclosed, intermediate between computer 16, windshield 14 and electrical power supply 18 are one or more power modulating elements and processes for controlling the same. Illustrated exemplary power modulating elements include a plurality of relay switches 20. Three exemplary switches 20 are shown, but the number can be varied. Each switch 20 is electrically connected at a power input terminal to power supply 18, at a power output terminal to windshield 14, and at a control terminal to computer 16. Switches 20 can be in the form of digital power relays, or solid state relays incorporating discrete electronic elements including transistors or electromechanical relays. The design of such relay switches is known in the art. Yet another option for modulating power to windshield 14 is pulse width modulation of the power using the ECU.

An exemplary power supply 18 is an alternator. Alternatively, power supply 18 can be in the form of a direct current motor-generator. Electrical power supply 18 is, in the illustrated embodiment, drivingly connected to an internal combustion engine 22. Power from engine 22 is used to rotate a rotating element of the electrical power supply 18 to produce electrical power that is selectively directed by relay switches 20 to windshield 14.

An exemplary command element is a button 24 accessible to a vehicle occupant 26. Button 24 is electrically connected to computer 16. Alternative command elements could include an accessible toggle switch, or a virtual button or switch located on a touch screen. Such a touch screen could also serve as an instrument cluster 28.

Exemplary windshield power management system 10 is disposed at least in part in computer 16. Computer 16 includes at least one electronic processor and an associated memory. The memory includes one or more forms of computer-readable media, and stores instructions executable by the processor for performing various operations, including such operations as disclosed herein.

The memory of computer 16 further stores remote data received via various communications mechanisms; e.g., computer 16 is generally configured for communications on vehicle network such as an Ethernet network or a controller area network ("CAN") bus or the like, and/or for using other wired or wireless protocols, e.g., Bluetooth, etc. Computer 16 may also have a connection to an onboard diagnostics connector such as an OBD-II connector. Via the CAN bus, OBD-II, Ethernet, and/or other wired or wireless mechanisms, computer 16 may transmit messages to various devices in a vehicle and/or receive messages from the various devices, e.g., controllers, actuators, sensors, switches, etc. as discussed herein. Although computer 16 is shown as a single computer in FIG. 1 for ease of illustration, it is to be understood that computer 16 could in fact include and various operation described herein could be carried out by one or more computing devices, e.g., vehicle component controllers such as are known and/or a computing device dedicated to the system 10.

The memory of computer 16 stores the collected data. Data may include data collected from a variety of devices. Data may additionally include data calculated therefrom in computer 16. In general, collected data may include any data that may be gathered by any data collection device 30 including sensors and/or computed from such data. Exemplary collection devices 30 include ultrasonic sensors, cameras, 360-view cameras, radar, V2V, V2I, Lane Guidance, Lidar and/or data collection devices that collect dynamic vehicle data, such as velocity, yaw rate, steering angle, etc. Exemplary sensors 30 particularly relevant to control of windshield 14 include a cabin temperature sensor, a cabin humidity sensor and an outside temperature sensor. The foregoing examples are not intended to be limiting; other types of data collection devices 30 could be used to provide data to computer 16.

Figure 2:
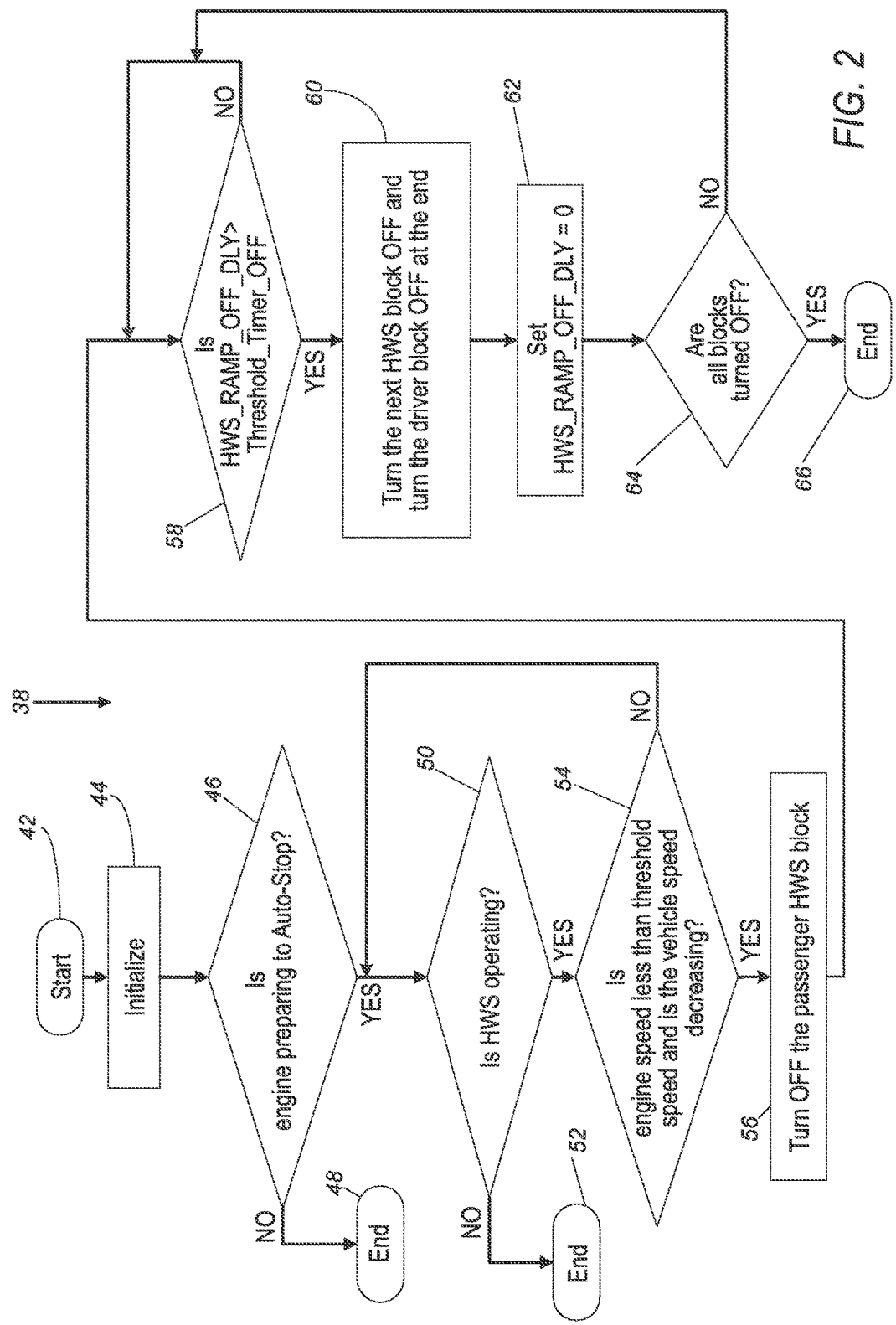
FIG. 2 is a flow chart of exemplary power management control computer programming for auto-stopping.
Figure 3:
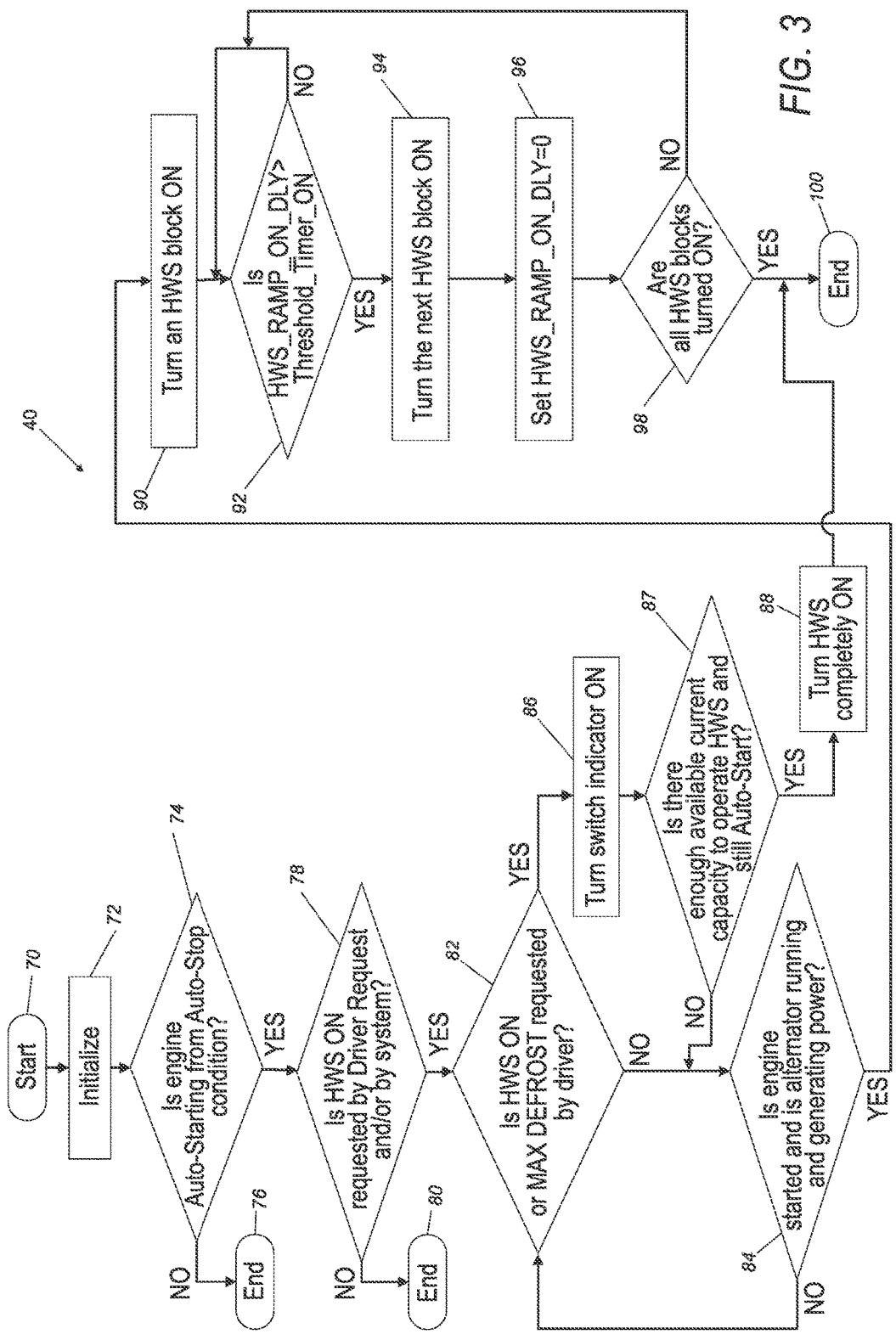
FIG. 3 is a flow chart of exemplary power management control computer programming for auto starting.

Schematic representations of exemplary software components of exemplary computer 16 are illustrated in FIG. 1. As used herein, a "software component" is programming such as is known to those skilled in the art to accomplish various operations attributed to a respective component as herein described. Certain software components may store and/or calculate data. Illustrated exemplary software components in computer 16 include an automatic start-stop management module 32, a cabin climate management module 34 and a heated windshield power-up/power-down management module (power management module) 36. Flow charts illustrating processes 38, 40 to be implemented as software programmings including various components described in the system 10, are illustrated in FIGS. 2 and 3. The precise structure of computer 16 and arrangement of memory and software therein is not critical to the present description.

FIG. 1 provides an exemplary schematic representation of an arrangement of components in a vehicle 10, including a computer 16 and exemplary software components that may execute thereon to manage a windshield power management system 10. Certain of the components are available commercially, such as start-stop systems and heated windshields 14.

An exemplary automatic start-stop management module 32 stops the vehicle's engine 22 when the vehicle 12 is brought to a stop, and restarts engine 22 when vehicle 12 is prepared to move again. Stopping engine 22 reduces fuel consumption of engine 22. Start-stop management module 32 monitors, by way of example, vehicle speed, a rate of change in vehicle speed, clutch pedal displacement (for manual transmission vehicles) and brake pedal application (for automated or automatic transmission vehicles) in determining when to stop engine 22. A start-stop system will likewise look at vehicle signals available from sensors 30, including by way of example, clutch pedal or brake pedal application, in determining when to restart engine 22. Algorithms for determining start-stop routines are known to those skilled in the art, as demonstrated by the availability of such systems in production vehicles such as the Ford F150 pickup truck, Ford Fusion and Jeep Cherokee.

An exemplary cabin climate management module 34 is responsive to both environmental inputs and to operator inputs. As noted above, information from sensors 30 for in-cabin temperature and humidity and outside temperature is used by cabin climate management module 34 in determining whether or not to issue a command turning on the heated windshield. For example, the cabin climate management module 34 may send an ON signal or command to power management module 36 when an interior cabin temperature is higher than an exterior temperature and the humidity inside the cabin is sufficiently high to create a risk of water condensing on windshield 14. Heating windshield 14 will prevent condensation of water on windshield 14, preserving driver visibility. Cabin climate management module 34 responds to input from actuator button 24 to which it is electrically connected. If a driver or passenger pushes exemplary button 24, a switch is closed indicating to cabin climate management module 34 a desire to activate heated windshield 14. When cabin climate management module 34 senses the switch condition change, it sends an ON signal or command to power management module 36.

Exemplary heated windshield power management module 36 monitors information from the start-stop management module 32 for conditions indicating that an initiation of a shut-down of the engine 22 is imminent, and monitors the cabin climate management module 34 for conditions indicating that the HWS 14 be activated or placed or maintained in an "ON" mode. Exemplary power management module 36, responsive to the processes outlined in flowcharts 38 and 40, issues commands to vehicle 12's power electronic system, including switches 20, to gradually power-up or to gradually power-down the electrical power supplied to the heated windshield 14 by the power supply 18.

Processing

Processes 38 and 40, illustrated in FIGS. 2 and 3, respectively, are example processes that may be executed in computer 16. The computer 16, as shown in these figures, can include programming to gradually turn off the heated windshield 14 when a request for an auto-stop is detected and stopping of engine 22 is imminent. In the exemplary embodiment, such a request can be generated by the automatic start-stop management module 32 responsive to sensed or measured values of exemplary parameters including brake pedal modulation, clutch pedal modulation, vehicle speed, engine speed and electrical current demand, that the vehicle will be initiating an auto-stop of engine 22. Computer 16 is programmed to send a signal indicating that the engine 22 is below a threshold speed and the vehicle speed is decreasing. The computer 16 is further programmed, responsive to receiving the signal that the vehicle 12 is below the threshold speed and slowing, and a signal that heating of the windshield has been requested, to begin gradually shutting down the heated windshield 14. The gradual shutdown or power decrease to the HWS 14 is alternatively characterized by discrete reduction steps, enabled by discrete electrical switches as described above, or substantially continuously by use of pulse width modulation, as also described above. Computer 16 is further programmed to send a signal confirming engine 22 has been restarted and the electrical power supply 18 is operating and generating electrical power after an auto-start request. The computer 16 is further programmed, responsive to receiving the signal that the engine 22 has been restarted, and that the electrical power supply 18 is operating and generating electrical power after an auto-start request, and the signal that heating of the windshield has been requested, to gradually increase electrical power to the heated windshield 14.

Exemplary signals include messages sent via vehicle 12's communications network. Such exemplary messages can more specifically include the setting of a memory value by computer programming executing logic diagrams 38 and 40, with the memory value being read by computer 16, or alternatively, a continuous voltage signal responsive to a selective setting of command element 24. Either may be used to indicate, for example, a request for heating of windshield 14. As with the decrease in power to the HWS 14, the gradual increase of power to the HWS 14 is enabled by discrete electrical switches, or substantially continuously by use of pulse width modulation. Process flows 38 and 40 each present just a single example of how the temporary disablement of the HWS can be activated and deactivated. The above undertakings of computer 16 are conducted substantially continuously. Computer 16 substantially continuously receives windshield heating demand data and start-stop data and substantially continuously determines whether to turn the heated windshield 14 on or off based at least in part on the substantially continuously received data.

Computer 16 executes the steps illustrated in FIG. 2 as described below. The computer program executing process 38 is initiated in start block 42. The computer program is initialized in process block 44. The initialization routine of block 44 includes conventional low-level software steps, well-known in the software art and not critical to the present description.

Next, in a decision block 46, it is checked as to whether or not the engine 22 is being prepared to auto-stop. When no, then the exemplary programming or process goes to end block 48 and terminates. Alternatively, the programming could loop back to an input side of block 46. When yes, then programming moves to decision block 50, where it is determined if the HWS is operating. When the HWS is not operating, then the exemplary programming goes to end block 52 and terminates. Alternatively, the programming could loop back to an input side of block 50 or yet alternatively block 46. When yes, the programming moves to decision block decision block 54.

Decision block 54 determines whether engine 22 has an engine speed less than a threshold, and if a vehicle speed is decreasing. When no, the programming loops back to an input side of decision block 50. When yes, the programming moves to process block 56, in which the gradual shut-down of the HWS 14 is initiated. The exemplary logic presumes windshield 14 is divided into discrete heating zones, with each zone having a discrete heating block being separately turned on and off. Exemplary windshield or HWS heating blocks include a passenger heating block, a driver heating block, and additional heating blocks, such as a top heating block running a length of windshield and a lower heating block also running a length of the windshield, with each heating block having its own relay. An alternative arrangement for HWS heating blocks is to have multiple overlaid heating elements disposed in the windshield, with each discrete element being considered a block. Yet another alternative arrangement of blocks is to have a single heating element for the windshield that responds to an increased amount of current or electrical power with increased heat production. The blocks correspond to discrete relays that individually direct a predetermined amount of current to the windshield, and collectively direct substantially all of the current potentially available to windshield 14 to heat heated windshield 14. Processes 38 and 40 presume that windshield 14 being broken up into discrete heating zones with discrete heating blocks associated with each zone.

In exemplary process block 56, the passenger HWS block is turned off by signaling an associated relay to open or for HWS to otherwise go to an off mode. Following process block 56, the logic of process 38 moves to decision block 58. Decision block 58 checks on whether the time since the most recently deactivated block was turned off (HWS_RAMP_OFF_DLY) has exceeded a predetermined threshold period of time (Threshold_Timer_OFF). An exemplary calibrated timer incorporated within heated windshield power-up/power-down management module 36 is employed to determine whether the threshold predetermined period of time has been met. Exemplary threshold periods include 100 milliseconds (msec), 200 msec and 300 msec. When the threshold has not been exceeded, process 38 circles back to an input side of decision block 58. When the threshold has been exceeded, process 38 moves to block 60 where the next HWS block is turned off. Process 38 moves to block 62, where the value of HWS_RAMP_OFF_DLY is reset to zero. From block 62, process 38 moves to decision block 64 which determines whether or not all of the blocks have been turned off. When no, process 38 loops back to an input side of block 58 to see if enough time has lapsed to terminate the next block. In the exemplary embodiment, the blocks are sequenced such that the driver block is the last block to be turned off. When block 64 determines that all of the blocks have been turned off, the process 38 moves to end block 66 and the process is terminated. In systems employing pulse width modulation as a means of controlling power to the windshield 14, a predetermined rate of power change may be employed to reduce power to the windshield. In an alternative logic process, process 38 could be initiated on starting vehicle 12, and terminated when vehicle 12 is no longer operating as when vehicle 12 is parked and an ignition switch is in an off condition.

Although not illustrated in FIG. 2, additional logic could be incorporated into process 38 to enable the HWS 14 to continue operating during an auto-stop. Continued operation would, with exemplary process logic, require that the driver have issued a request for the HWS 14 to be on, and that there is sufficient available electric current to support restarting the engine during an auto-start with the HWS 14 operating.

Computer 16 executes the steps illustrated in FIG. 3 as described below. The computer program executing process 40 is initiated in start block 70. The computer program is initialized in process block 72. The initialization routine of block 72 includes conventional low-level software steps, well-known in the software art and not critical to the present description.

Next, in a decision block 74, it is checked as to whether or not the engine 22 is being prepared to auto-start from an auto-stop. When no, then the exemplary programming goes to end block 76 and terminates. Alternatively, the programming could loop back to an input side of block 74. When yes, then programming moves to decision block 78, where it is determined whether there is a request for HWS to be in the ON mode from either the system 10 or the driver 20, via command element 24. When there is no request for HWS 14 to be on, then the exemplary programming goes to end block 80 and terminates. Alternatively, the programming could loop back to an input side of block 78 or yet alternatively to block 74. When yes, the programming moves to decision block decision block 82. Decision block 82 determines whether the request for either HWS or a MAX DEFROST mode (which also actuates HWS) has been made by the driver 20. When no, the process moves to decision block 84. When yes, the process moves to process block 86, in which an operator-viewable indicator, such as a light or a message on the instrument cluster 28, is provided. Providing a message or indicator light affirms that there is already a demand for the heated windshield to be activated and helps avoid operator uncertainty as to whether heated windshield 14 is in an on mode or an off mode.

Process 40 moves from block 86 to decision block 87 with block 87 determining whether there is enough available current capacity to operate the heated windshield 14 and still auto-start engine 22. If there is enough current, process 40 moves from block 87 to process block 88 and turns the HWS 14 completely on. Once HWS 14 is turned on, process 40 moves to end block 100 and the process is terminated. When decision block 87 determines that there is not enough current capacity to both operate the HWS 14 and still auto-start engine 14, process 40 moves to decision block 84. Decision block 84 determines whether the engine 22 has started and whether alternator 18 is running and generating power. When no, process 40 loops back to process block 82. When yes, process 40 moves to process block 90, and turns on a first HWS block. In the exemplary process, the driver block is the first HWS block turned on. Process 40 then moves to decision block 92.

Decision block 92 checks on whether the time since the most recently activated block was turned on (HWS_RAMP_ON_DLY) has exceeded a predetermined threshold period of time (Threshold_Timer_ON). The exemplary calibrated timer incorporated within heated windshield power-up/power-down management module 36 is employed to determine whether the threshold predetermined period of time has been met. Exemplary threshold periods include 100 milliseconds (msec), 200 msec and 300 msec. When the threshold has not been exceeded, process 40 circles back to an input side of decision block 92. When the threshold has been exceeded, process 40 moves to block 94 where the next block is turned on. Process 40 moves to block 96, where the value of HWS_RAMP_ON_DLY is reset to zero. From block 96, process 40 moves to decision block 98 which determines whether or not all of the blocks have been turned on. When no, process 40 loops back to an input side of block 92 to see if enough time has lapsed to turn on the next block. When block 64 determines that all of the blocks have been turned on, the process 40 moves to end block 100 and the process is terminated. In systems employing pulse width modulation as a means of controlling power to the windshield 14, a predetermined rate of power change may be employed to restore power to the windshield. In alternative logic processes, process 40 could be initiated on starting vehicle 12, and terminated when vehicle 12 is no longer operating.

Figure 4:
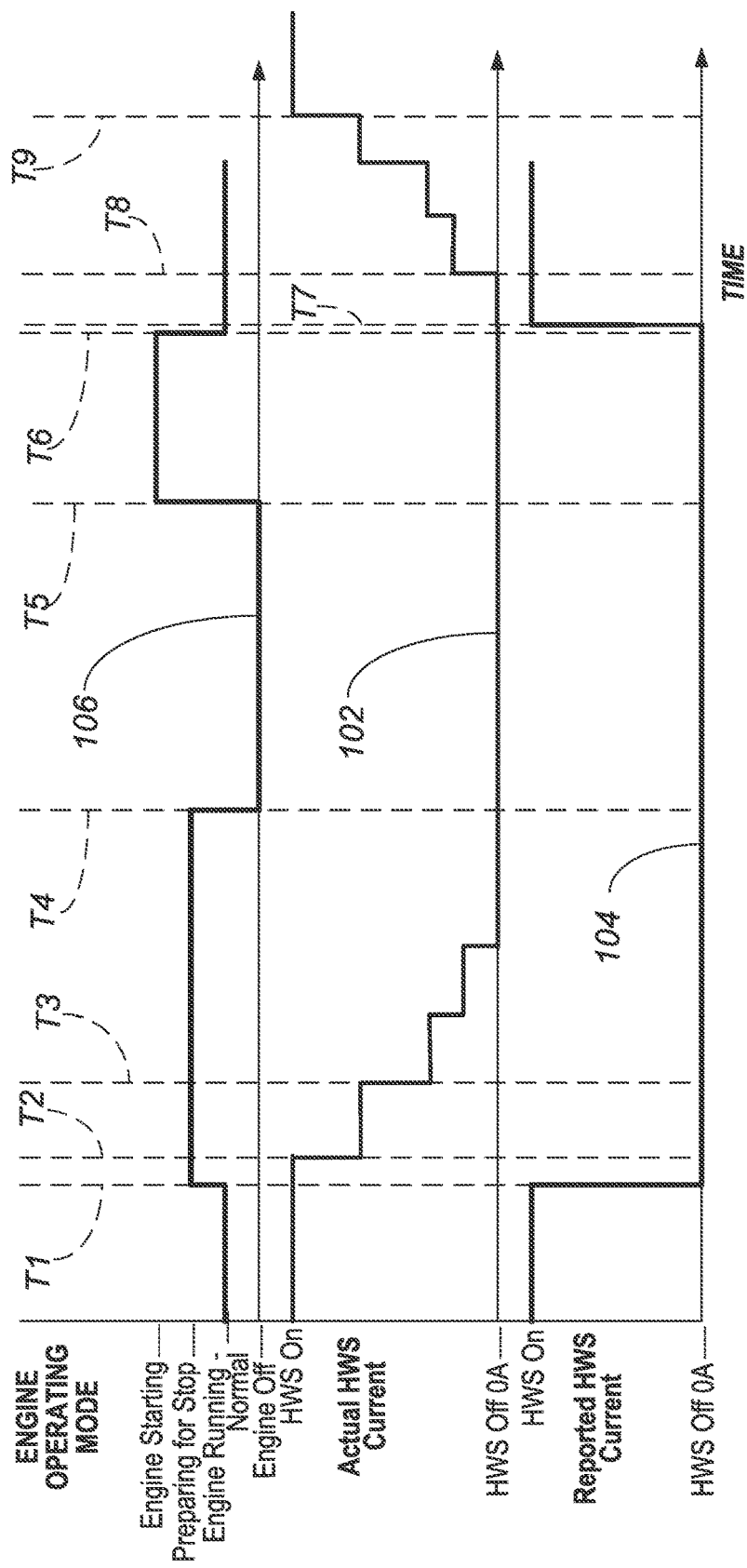
FIG. 4 is an exemplary plot of power management parameters as a function of time during an engine stop and engine start cycle.

Execution of process 38 and 40 is illustrated in FIG. 4. FIG. 4 features three traces: a plot of actual current 102, a plot of reported current 104 and a plot of engine operating mode 106. A left side of FIG. 4 illustrates a shutting down of power to heated windshield 14 in accord with process 38. A right side of FIG. 4 illustrates a restoration of power to heated windshield 14 in accord with process 40.

Engine operating mode is shown on the left as starting in the Engine Running—Normal mode, in which engine 22 is operating at idle speed or above. Responsive to detection of an auto-stop command, engine 22, at time T1, is placed in a Preparing for Stop mode. At time T4, fuel to engine 22 is cut off, causing engine 22 to stop. An exemplary period between times T1 and T4 is 500 msec. At time T5, the starting of engine 22 is initiated. The time between T5 and T6, the Engine Starting mode, represents a period of time for engine cranking. At time T6, engine 22 is running again in its normal mode.

Actual current plot 102 is an exemplary plot of current supplied to HWS 14 as a function of time. Plot 102 has four steps at each end, as would be associated with an aggregate power management system 10 having four blocks associated with HWS 14. On the left side of plot 102, current drops from a full on condition to a full off condition of zero amps in four steps. Each of the steps has a length along the time axis, by way of example, the time between time T2 and time T3, at least equal to the value Threshold_Timer_OFF. The steps for increasing current on restarting do not need to be a mirror image of the steps for decreasing current on stopping. As noted above, one exemplary time period for Threshold_Timer_OFF is 100 msec. As noted in the above description, such heating blocks may have a variety of forms.

Reported HWS current 104 is a value reported to automatic shut-down management module 32 instead of the actual HWS current. The exemplary value of the reported HWS current 104 goes to zero at time T1, coincident with the transition of engine 22 to its Prepare to Stop mode. The timing of setting the reported value of HWS current to zero is selected to satisfy an auto-stop initiation condition of total electrical current demand not exceeding a pre-determined magnitude. The exemplary actual current 102 to HWS is gradually reduced as described above starting at time T2, only after the auto-stop initiation conditions have been satisfied. The coordinated use of reported HWS current 104 and actual HWS current 102 beneficially allows a more rapid auto-stop, increasing the amount of time in the stopped condition by one second in the exemplary embodiment. Reported HWS current 104 is increased to a full-on condition at time T7 after confirming that engine 22 has been restarted. No current is supplied to the HWS during engine starting or cranking between times T5 and T6. Actual HWS current 102 is not increased until time T8 when it has been determined, in accord with the above-described process 38 that the alternator 18 is running and supplying power. Current is fully restored at time T9.

Figure 5:
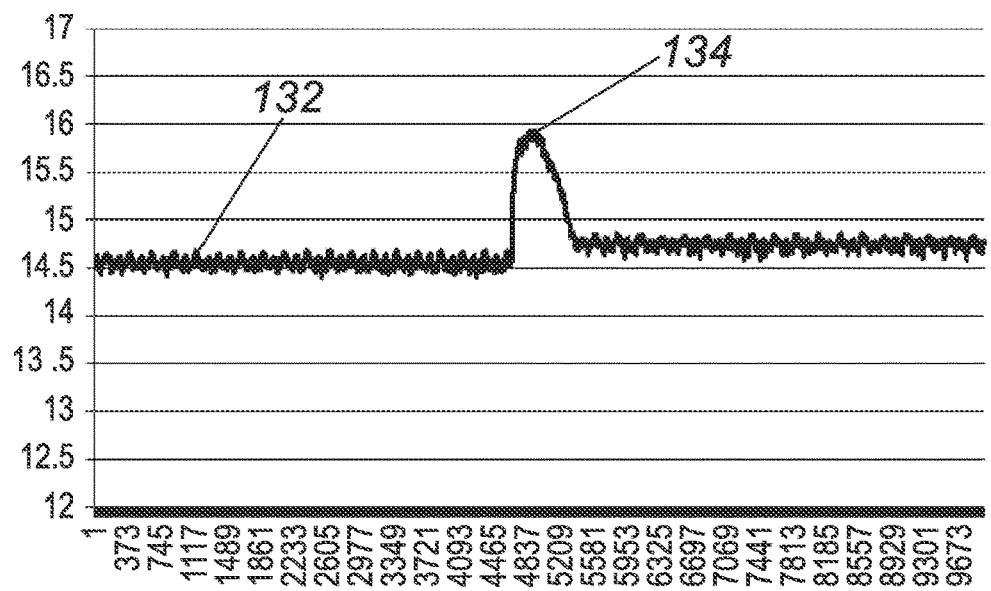
FIG. 5 is an exemplary plot of voltage output of an alternator as a function of time with a sudden deactivation of the heated windshield.
Figure 6:
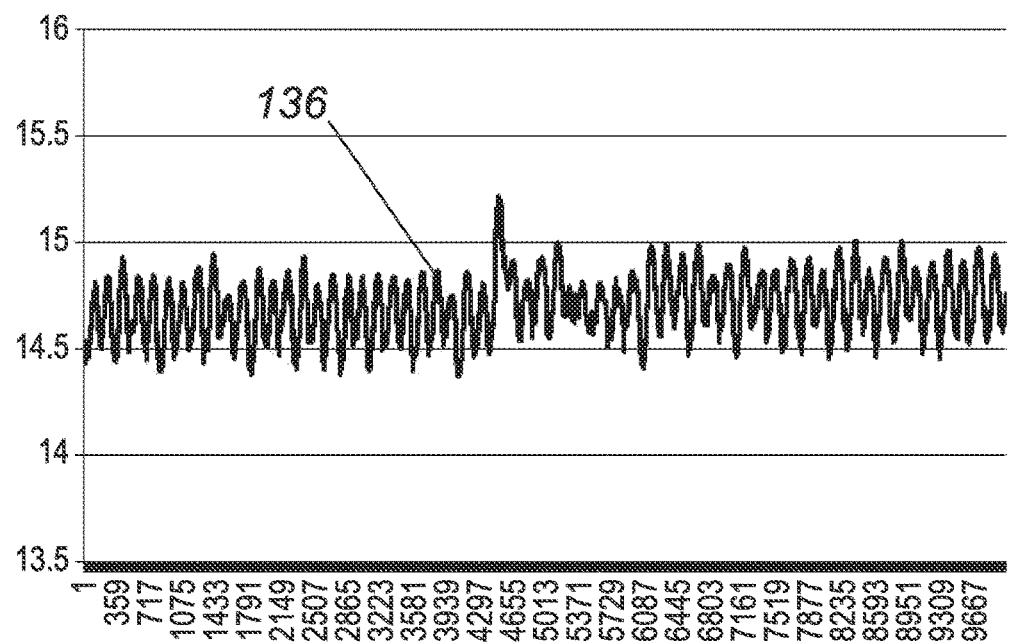
FIG. 6 is an exemplary plot of voltage output of an alternator as a function of time with a gradual deactivation of the heated windshield.

FIG. 5 and FIG. 6 respectively show, for a system not incorporating the disclosed graduated reduction and increase in current to the HWS and for a system incorporation the disclosed graduated reduction and increase in current to the HWS, the variance with time of vehicle system voltage at the alternator during shutdown of HWS 14. FIG. 5 illustrates a plot of voltage 132 exhibiting a voltage spike 134 that occurs when a sudden shutdown of power to HWS 14 occurs. The exemplary spike is nearly 1.5 volts in magnitude. Such a spike is associated with engine speed flare, as engine speed momentarily increases in response to a drop in resisting torque from alternator 18. FIG. 6 illustrates a plot of voltage 136 exhibiting a substantially indiscernible effect on voltage at the alternator 18 resulting from the disclosed graduated shutdown of electrical power to the HWS 14.

The above processes 38, 40 are exemplary illustrative examples and are not intended to be limiting. For example, the termination of the program after certain initial inquiries is illustrated in the exemplary processes primarily to avoid the possibility of the programs continually looping. As noted above, an alternative would be to provide loops to check on whether the vehicle 12 is still in an operating state, or is instead parked and inactive. It is also possible to integrate the processes of FIGS. 2 and 3 into a single program illustrated by a single flow chart. However, separate flow charts were employed for the purpose of clarity.

CONCLUSION

Disclosed herein is a method and a system for gradually reducing power to an electrical accessory, including as an illustrative example a heated windshield, when stopping a vehicle and for gradually increasing power to the heated windshield when starting a vehicle, particularly a vehicle having a start-stop system. The description provided herein is intended to be illustrate one or more examples of the disclosed idea, but is not intended to describe all possible variations of the disclosed idea. For example, the idea can be applied to alternative accessories such as heated seats and electrical resistive cabin heaters. Additionally, the control steps described above can be varied from the exemplary description and still provide the same results. For example, instead of having the logic terminate at blocks 48 and 52, additional decision blocks could be provided to determine whether the vehicle is still in an operating mode, and terminating when the vehicle is not in an operating mode, and looping the logic back to check, respectively, for Auto-Stop preparation and HWS operation when the vehicle is in an operating mode.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

With regard to the references to computers in the present description, computing devices such as those discussed herein generally each include instructions executable by one or more computing devices such as those identified above, and for carrying out blocks or steps of processes described above. For example, process blocks discussed above are embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method of controlling electrical power to a vehicle accessory, the method comprising:
    detecting in a controller a request for an auto-shutdown of an internal combustion engine of a vehicle;
    gradually reducing, in a plurality of graduated steps of 300 milliseconds or less, the electrical power from an electrical power supply driven by the internal combustion engine supplied to the vehicle accessory on a predetermined schedule responsive to such a detection prior to the auto-shutdown;
    determining the occurrence of a restart of the internal combustion engine;
    gradually increasing, in a plurality of graduated steps of 300 milliseconds or less, the electrical power supplied to the vehicle accessory on a predetermined schedule responsive to the restart.

2. The method of claim 1, wherein the vehicle accessory is initially activated by one of vehicle automatic controls and a vehicle operator command.

3. The method of claim 1, wherein the electrical power is supplied to the vehicle accessory only when the engine is running and the electrical power supply driven by the engine is generating electrical power.

4. The method of claim 3, wherein deactivation of the vehicle accessory is initiated only when an engine speed is below a target speed.

5. The method of claim 1, wherein after the request for the auto-shutdown is detected and before the electrical power to the vehicle accessory is reduced, a magnitude of a reported current to the vehicle accessory is decreased to be substantially equal to zero.

6. The method of claim 5, wherein before the electrical power to the vehicle accessory is increased, the magnitude of the reported current to the vehicle accessory is increased from substantially equal to zero to substantially equal to a fully on condition.

7. A system, comprising a computing device that includes a processor and a memory, the memory storing instructions executable by the processor to:
   detect a request for an auto-shutdown of an internal combustion engine of a vehicle;
   gradually reduce, in a plurality of graduated steps of 300 milliseconds or less, electrical power from an electrical power supply driven by the internal combustion engine supplied to a vehicle accessory on a predetermined schedule responsive to such a detection prior to the auto-shutdown;
   determine the occurrence of a restart of the internal combustion engine;
   gradually increase, in a plurality of graduated steps of 300 milliseconds or less, the electrical power supplied to the vehicle accessory on a predetermined schedule responsive to the restart.

8. The system of claim 7, wherein the vehicle accessory is initially activated by one of vehicle automatic controls and a vehicle operator command.

9. The system of claim 7, wherein the electrical power is supplied to the vehicle accessory only when the engine is running and the electrical power supply driven by the engine is generating electrical power.

10. The system of claim 9, wherein deactivation of the vehicle accessory is initiated only when an engine speed is below a target speed.

11. The system of claim 7, wherein after the request for the auto-shutdown is detected and before the electrical power to the vehicle accessory is reduced, a magnitude of a reported current to the vehicle accessory is decreased to be substantially equal to zero.

12. The system of claim 11, wherein before the electrical power to the vehicle accessory is increased, the magnitude of the reported current to the vehicle accessory is increased from substantially equal to zero to substantially equal to a fully on condition.

13. A system, comprising a computing device that includes a processor and a memory, the memory storing instructions executable by the processor to:
   detect a request for an auto-shutdown of an internal combustion engine of a vehicle;
   gradually reduce, in a plurality of graduated steps of 300 milliseconds or less, the electrical power from an electrical power supply driven by the internal combustion engine supplied to a heated windshield on a predetermined schedule responsive to such a detection prior to the auto-shutdown;
   determine the occurrence of a restart of the internal combustion engine;
   gradually increase, in a plurality of graduated steps of 300 milliseconds or less, the electrical power supplied to the heated windshield on a predetermined schedule responsive to the restart.

14. The system of claim 13, wherein the electrical power is supplied to the heated windshield only when the engine is running and the electrical power supply driven by the engine is generating electrical power.

15. The system of claim 14, wherein deactivation of the heated windshield is initiated only when an engine speed is below a target speed.

16. The system of claim 13, wherein after the request for the auto-shutdown is detected and before the electrical power to the heated windshield is reduced, a magnitude of a reported current to the heated windshield is decreased to be substantially equal to zero.

17. The system of claim 16, wherein before the electrical power to the heated windshield is increased, the magnitude of the reported current to the heated windshield is increased from substantially equal to zero to substantially equal to a fully on condition.

* * * * *